United States Patent [19]

Liddle

[11] 4,157,011
[45] Jun. 5, 1979

[54] GAS TURBINE FLYWHEEL HYBRID PROPULSION SYSTEM

[75] Inventor: Sidney G. Liddle, Harper Woods, Mich.

[73] Assignee: General Motors Corporation, Detroit, Mich.

[21] Appl. No.: 826,641

[22] Filed: Aug. 22, 1977

[51] Int. Cl.² .............................................. F02C 9/02
[52] U.S. Cl. ................................ 60/39.27; 180/66 A
[58] Field of Search ............. 60/39.14, 39.16 S, 39.27, 60/39.29; 180/66 A

[56] References Cited
U.S. PATENT DOCUMENTS 3,255,586  6/1966  Hennig et al. ...................... 60/39.27

FOREIGN PATENT DOCUMENTS 2509670  9/1976  Fed. Rep. of Germany ........ 180/66 A

*Primary Examiner*—Louis J. Casaregola
*Attorney, Agent, or Firm*—J. C. Evans

[57] ABSTRACT

A vehicle drive system includes a gas turbine engine having a compressor inlet control to reduce total engine air flow to between two and three percent of normal air flow during periods where fuel flow to the gas turbine engine combustor is terminated. An auxiliary flywheel is mounted between a power turbine output shaft and engine reduction gear for power transfer to the rear differential of a road vehicle. The auxiliary flywheel is driven at high speed of rotation of the power shaft to store energy which is used to start the engine following off modes of operation wherein air flow to the compressor is severely restricted and fuel flow to the combustor is terminated.

1 Claim, 4 Drawing Figures

U.S. Patent
Jun. 5, 1979
4,157,011
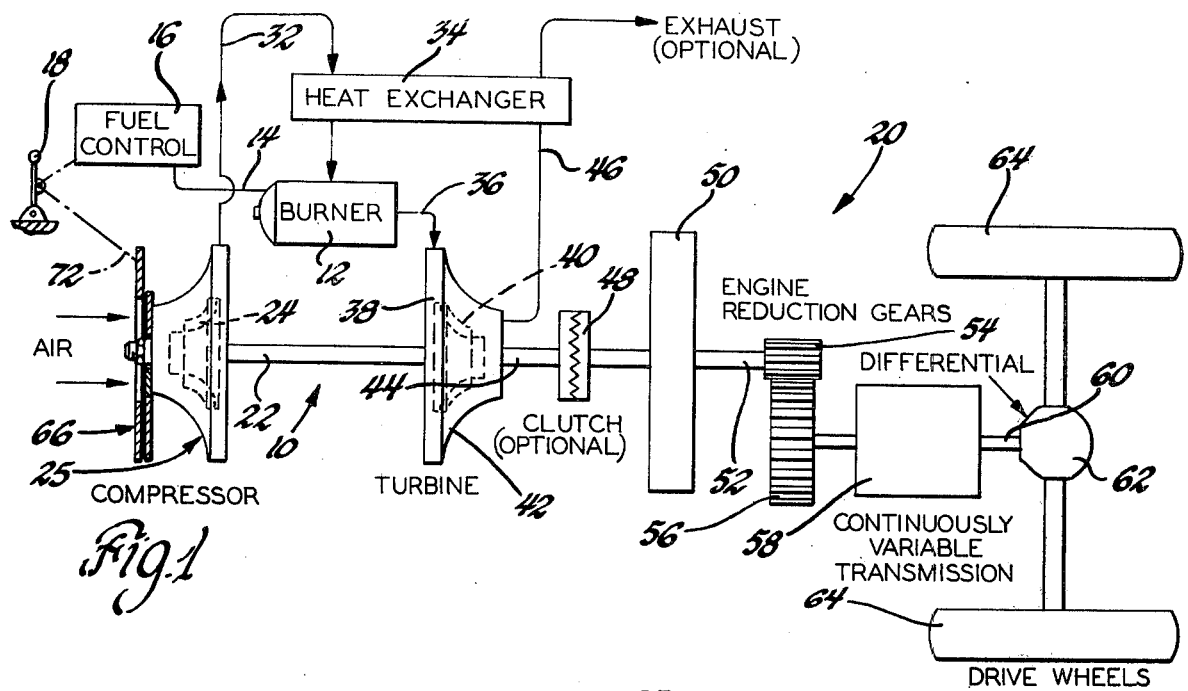
Fig. 1
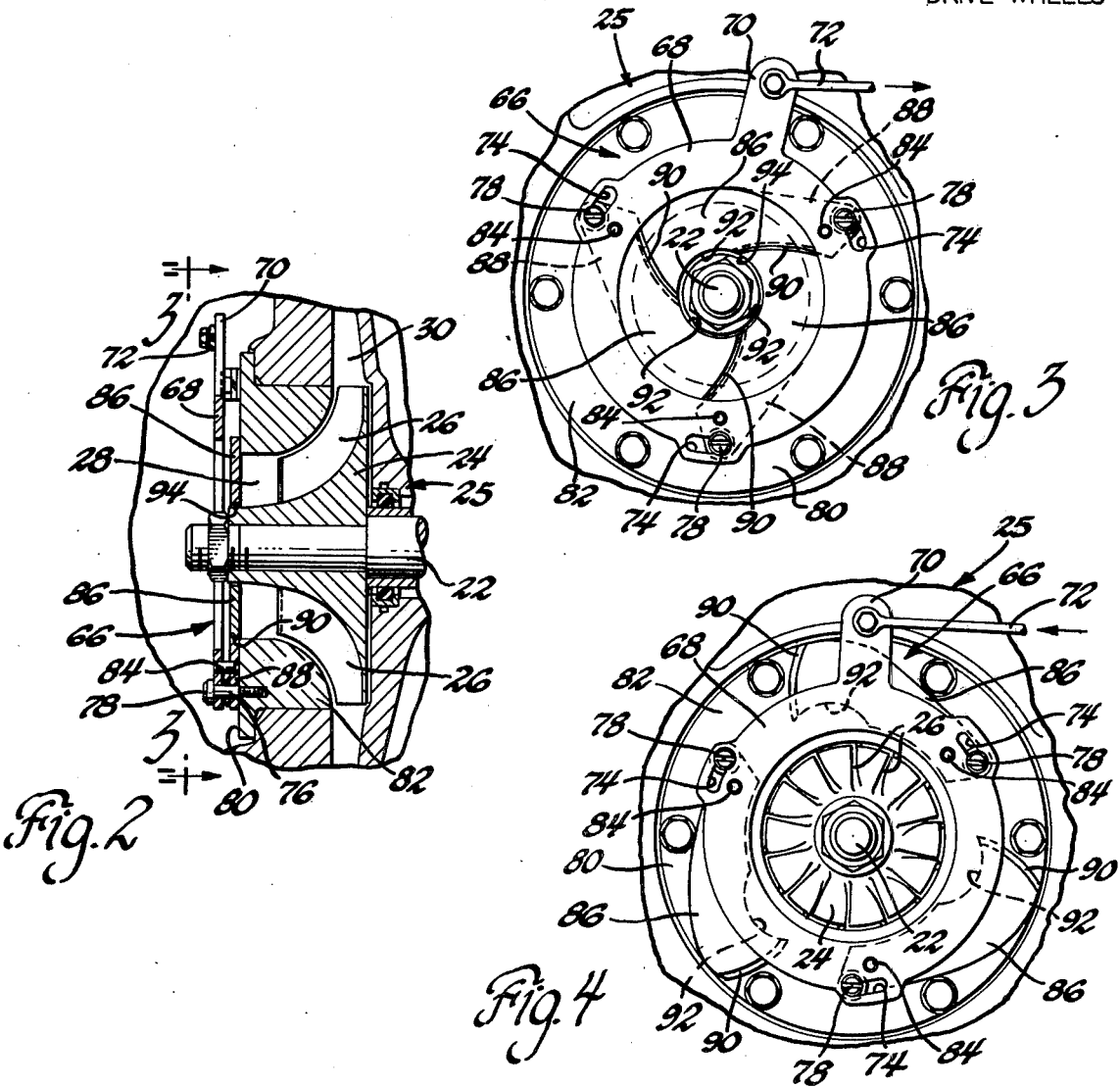
Fig. 2
Fig. 3
Fig. 4

GAS TURBINE FLYWHEEL HYBRID PROPULSION SYSTEM

This invention relates to gas turbine engine vehicle drive systems and more particularly to gas turbine flywheel hybrid propulsion systems for road vehicles.

It has been determined that hybrid gas turbine flywheel propulsion systems are most efficient when the combustor of a gas turbine engine is operated in an on/off mode wherein fuel is supplied to the combustor during the on mode and fuel flow to the combustor is completely terminated during the off mode. When the engine is turned on, the fuel control is set at an optimized brake specific fuel consumption point. During this phase, power is utilized to charge a flywheel component and/or to drive the vehicle. Whenever power is not needed, fuel supply is completely cut off. Energy in the flywheel is used to restart the engine during an on mode whenever fuel is supplied to the engine combustor.

In the case of piston engines having such a hybrid power arrangement the amount of energy required to restart the engine is small, in the order of about one horsepower-second at idle speed to up to about 17 horsepower-second to design speed under maximum power conditions of operation. Such relatively small starting energies enable the engine to be completely stopped when power is not needed and to restart it by means of a flywheel when power is required.

Gas turbine engines, however, offer a different problem. Such engines require start power. In the case of one single shaft gas turbine engine approximately 27 horsepower-seconds is required to get an engine up to idle speed and in the order of 110 horsepower-second to reach an engine speed for maximum horsepower operation.

The aforesaid gas turbine engine numbers are six to twenty-seven times comparable values for a piston engine. As a result, gas turbine engines in vehicular applications, heretofore are not shut-off during periods when power is not needed.

Moreover, with gas turbine engines of the aforesaid type, a gasifier impeller configuration is such that as soon as fuel is cut off the engine stops in a few seconds because of pumping losses produced as a large amount of air is drawn through the compressor and discharged into the turned-off burner and turbine component of the engine.

The aforesaid high energy requirements are in part due to the high speed of operation of the rotors in the machinery.

An object of the present invention, therefore, is to provide an improved gas turbine hybrid flywheel propulsion system wherein means are provided to reduce compressor pumping losses during no-power periods of gas turbine engine operation whereby the rotor components of a gas turbine engine are in part used as a flywheel to store regenerative braking energy to start up the gas turbine engine and to maintain an efficient on-period of engine operation.

Still another object of the present invention is to provide an improved gas turbine flywheel hybrid propulsion system for a road vehicle wherein compressor impeller pump losses during an off period of single shaft gas turbine engine operation are minimized by the use of an inlet air control for reducing air flow through a gas turbine engine compressor inlet thereby to reduce such pumping losses during engine start and during periods of fuel cut-off during engine operation and wherein a small flywheel mounted on the same shaft as a compressor and turbine of the single shaft gas turbine stores energy during on modes of engine operation and along with the inertia of the rotor components of the single shaft gas turbine engine are utilized to bring the engine up to idle speed during engine start and to maintain engine speed between 80–100% of its design speed as fuel flow to the engine combustor is turned on and off during engine operation to maintain a constant turbine inlet temperature for maximum engine efficiency.

Yet another object of the present invention is to provide an improved gas turbine engine flywheel combination wherein the gas turbine engine includes a compressor rotor and a turbine rotor connected to a single shaft and with the turbine output shaft being directly connected to a flywheel and wherein the engine includes a burner having fuel flow thereto during an on phase of operation and no fuel flow thereto during an off phase of operation; and inlet control means for controlling air flow to the compressor during the off mode to prevent air flow pump losses in the compressor and to utilize the inertia of the compressor and turbine rotors as well as that of the flywheel to start the engine during an off mode and wherein control means are utilized to cycle the inlet control means opened and closed in response to engine speed and more particularly so that, when the speed of the gas turbine engine drops to 80% to 85% of design speed, the compressor inlet controller is opened and fuel is introduced to the burner until the engine is reaccelerated up to full speed at a pre-set turbine inlet design temperature condition and thereafter the inlet control means is cycled opened and closed and fuel flow to the burner is cycled on and off to maintain the pre-set turbine inlet design temperature during the on mode of operation so as to produce an optimized brake specific fuel consumption.

Further objects and advantages of the present invention will be apparent from the following description, reference being had to the accompanying drawings wherein a preferred embodiment of the present invention is clearly shown.

FIG. 1 is a diagrammatic view of a gas turbine hybrid propulsion system in accordance with the present invention;

FIG. 2 is a vertical cross-sectional view of a gas turbine compressor including an inlet air controller in accordance with the present invention;

FIG. 3 is a view of the controller in FIG. 2 taken along the line 3—3 of FIG. 2 showing the controller in a reduced air flow position; and FIG. 4 is a view like FIG. 3 showing the controller in a full open position.

Referring now to FIG. 1, the system of the present invention is to a single shaft gas turbine engine 10 including a combustor 12 having fuel supplied therethrough by a conduit 14 under the control of a fuel control 16 that is associated with a manually positionable operator 18. The operator 18 is positioned in an on position and a start position to regulate power supply from the gas turbine engine 10 to a vehicle propulsion system 20.

In accordance with the present invention, the single shaft gas turbine engine includes a drive shaft 22 connected at one end to a rotor 24 of an air compressor 25 having a plurality of centrifugal blades 26 thereon for impelling air from an axial inlet 28 to a radially outwardly directed diffuser 30. The diffuser 30 is connected to a discharge conduit 32.

The discharge conduit 32 is directed through a regenerator or exchanger 34 from whence it is directed into the combustor or burner 12 for supplying air thereto to be burned with fuel from the conduit 14. Exhaust from the combustor 12 is directed through an outlet conduit 36 to supply an inlet nozzle 38 to a turbine rotor 40 within a turbine housing 42. The rotor 40 is connected to an extension of shaft 22 as turbine power shaft 44.

Exhaust from the turbine 42 is directed through a discharge 46 thence through the heat exchanger 34 to atmosphere.

The propulsion system 20 includes a clutch 48 that connects the power shaft 44 to a flywheel 50. The flywheel 50 is connected in turn to the input 52 of engine reduction gears 54, 56. The output from the reduction gears 54, 56 is connected to a continuously variable transmission 58 having its output connected by a drive shaft 60 to a differential 62 for directing power to drive wheels 64 of a vehicle.

A single shaft gas turbine engine 10 without the illustrated associated propulsion system 20 including a flywheel 50 requires approximately 27 horsepower-seconds to cause the turbine engine to get up to idle speed which is approximately 50% of full design speed. Furthermore, it requires approximately 110 horsepower-seconds to reach the speed required for maximum horsepower. Such requirements are for automotive type gas turbine engines with a compressor driven by the power turbine of a single shaft gas turbine engine 10. Heretofore, such gas turbine engines had to be maintained partly under power and could not come to a complete stop whenever power was not needed. Moreover, the engine would stop in a few seconds when fuel was cut off to the combustor of the engine because of pumping losses due to a compressor impeller such as impeller blades 26 on the rotor 24 acting on unrestricted inlet air to the compressor.

Moreover, in such single shaft gas turbine engines there is a high energy requirement to start the gas turbine engine which is due to the inertial mass of the rotary components of a compressor 25 and the turbine 42.

In accordance with the present invention, it is recognized that the rotating mass of the rotary parts of the compressor 25 and turbine 42 in themselves constitute a flywheel. Furthermore, if pumping losses are minimized in such single shaft engine the rotary components thereof can be used as part of a flywheel system to store regenerative braking energy.

In accordance with the present invention an inlet air flow controller 66 is located upstream of the axial inlet 28 of the compressor 25 and is operative to severely restrict air entrance to the compressor when power is not needed. Since air flow into the compressor 25 is eliminated pumping losses are negligible.

The inlet air flow controller 66 is representative of any device that will reduce the total mass air flow into the inlet 28. For purposes of the present invention, it is only necessary to point out that it has a control ring 68 with a crank arm 70 connected by means of a cable 72 to the manual control operator 18. The ring 68 has three equally spaced arcuate slots 74 therein each of which is guidably supported on a shaft 76 of a retainer nut 78 secured to the front face 80 of the shroud 82 defining the inlet 28. The ring 68 further includes a plurality of equally spaced pins 84 thereon each of which is directed through a pivotal iris element 86. Each of the elements 86 includes an end portion 88 pivoted to the shroud 82 by the retainer nut 78. Furthermore each of the iris elements 86 includes a free end 90 which abuts against a portion of an adjacent iris element 86 when they are in a closed position as shown in FIG. 3 to locate curved segment 92 on each of the blades in a continuous circle that defines an annular orifice 94 constituting the only air flow passage into the inlet 28. In such an arrangement of approximately two to three percent of the normal air flow is allowed to enter the compressor to carry off heat generated by rotation of the rotor 24 and impeller blades 26 in the compressor during an off phase of operation.

Since there is no pumping loss, the rotary components of the engine 10 constitute a rotary mass acting as a flywheel. This mass is supplemented by the mass of the auxiliary flywheel 50 to maintain an energy level in the system to avoid the need to continuously supply fuel to the burner 12.

A further feature of the present invention is that the auxiliary flywheel 50 is mounted between the engine 10 and the engine reduction gear 54, 56. Because the power shaft 44 is operated at high speeds during engine operation, physical size of the flywheel 50 is minimized. Furthermore, the continuously variable transmission 58 is connected to the output of the reduction gears 54, 56. The continuously variable transmission is preferred for use with most other flywheel hybrid vehicle systems. Accordingly, it does not add to the complications of the illustrated arrangement. Moreover, some proposed hybrid systems require the use of two transmissions, one for the heat engine and one for the flywheel portion of the system. In the illustrated arrangement, because the flywheel 50 and heat engine are on a common shaft, no extra gear sets are required.

In accordance with another principle of the present invention, the illustrated heat engine, in the form of the single shaft gas turbine engine 10 is operated in a totally on and totally off mode as contrasted to prior operated single shaft gas turbine engines wherein fuel supply is required even when power is not required. Thus, the gas turbine engine 10 can be operated over a narrow range of rotor speed which is a preferred mode of operation for such gas turbine engines. An ideal type of an engine for such a system is the illustrated single shaft gas turbine engine 10 which operates over a speed range of 85% to 100% of the ultimate design speed of the gas turbine engine. By so operating the gas turbine engine 10, the turbine inlet temperature can be optimized so as to minimize fuel consumption of the engine 10.

In operation, the illustrated engine 10 is started by a starter battery combination (not shown) as in a conventional engine. In such a case, the flywheel 50 is either at zero speed or the engine has been off for a period where the speed rotary mass of the engine 10 and the auxiliary flywheel 50 is too low to bring the engine up to idle. In cases where the flywheel 50 is rotating at a sufficiently high speed it then will, itself, be used to start the engine.

In either case of a start operation, the inlet air flow controller 66 is closed as shown in FIG. 3.

Once the engine is up to idle speed, which is about 50% of design speed, the controller 66 is opened as shown in FIG. 4 and fuel is introduced into the burner 12 by moving the controller 18 from its start position to an on position.

The engine combustion in burner 12 is then utilized to accelerate the engine up to design speed. Once this occurs, the controller is cycled closed whenever fuel flow is cut off. The vehicle can therefore be driven without fuel consumption for a limited period of time off the inertia of the rotary components of the engine 10 and the inertia of the auxiliary flywheel 50. As soon as the speed drops to 80% or 85% of the design speed, the controller 66 is reopened into the position shown in FIG. 4 and fuel is reintroduced into the burner 12. The engine is immediately accelerated up to 100% of design speed. As a result, during all phases of vehicle operation, when the engine is on, the engine speed varies in a range of from 80% to 100% with a carefully controlled turbine inlet temperature and resultant fuel economy. All of the aforesaid control of both the iris opening between the positions shown in FIGS. 3 and 4 and the introduction of fuel to the burner 12 is done at a desired turbine inlet design temperature. The cycle of opening and closing the iris and turning on and off of fuel is repeated as necessary to meet the requirement of the vehicle and the particular driving cycle.

An optional feature in the aforesaid arrangement is the provision of a clutch between the engine 10 and the auxiliary flywheel 50. It is closed whenever the vehicle is operating but is opened when the vehicle is not operated. The energy losses from the engine 10 are higher than in the auxiliary flywheel 50 when the car is parked. Accordingly, if the clutch is opened while the engine is stopped and the car is parked the flywheel 50 still will rotate and can be used to restart the engine 10 if the parked time period is of short duration.

While the embodiments of the present invention, as herein disclosed, constitute a preferred form, it is to be understood that other forms might be adopted.

The embodiments of the invention in which an exclusive property or privilege is claimed are defined as follows:

1. A hybrid vehicular propulsion system comprising a gas turbine engine, said engine including a compressor having an air inlet and outlet, an impeller having blades thereon located within said compressor, means including a fuel controller and a turbine for driving said impeller during an on mode wherein fuel is supplied to the gas turbine engine and an off mode of operation wherein fuel supply is terminated to the gas turbine engine, a power shaft connected to said turbine, an auxiliary flywheel directly connected to said power shaft for driving said turbine and said gas turbine engine during an off mode of operation, inlet air control means to minimize compressor impeller blade pump loss during the off mode of operation, said inlet air control means including a plurality of flow control elements in said inlet of said compressor to reduce flow of air through the impeller to two to three percent of normal air flow therethrough during the off mode and sufficient to carry off heat generated by windage loss of said impeller, means coupling said auxiliary flywheel to be driven by the turbine at no speed reduction to minimize the mass of said auxiliary flywheel, and means coupled to said flywheel including a continuously variable transmission for driving the vehicle, said inlet air control means being operative to close said flow control elements during engine start to eliminate pumping losses from the compressor impeller, means for concurrently positioning said inlet air control means and said fuel controller when the engine is up to idle speed to open the flow control vanes and introduce fuel for driving the gas turbine engine during the on mode of operation, said control means and fuel controller further being continuously operative at off and on cycles when said engine reaches a predetermined design speed irrespective of load changes thereon, the off cycle operative to close said flow control elements and terminate fuel flow whereby the vehicle is driven by built-in energy of rotation of the combination of said auxiliary flywheel, turbine and said compressor impeller with the built-in energy of rotation supplying power during a transient fall in engine speed to 80% to 85% of said predetermined engine design speed, the on cycle reopening said inlet air control means and fuel controller thereafter when the engine speed drops to 80% to 85% of said predetermined engine design speed to reopen air flow to said compressor and reintroduce fuel to reinstitute the on mode of gas turbine engine operation until the predetermined engine design speed is reestablished.

* * * * *